United States Patent [19]

Saito

[11] Patent Number: 5,188,087
[45] Date of Patent: Feb. 23, 1993

[54] METHOD FOR CONTROLLING AN EXHAUST GAS RECIRCULATION SYSTEM OF A FLEXIBLE FUEL VEHICLE ENGINE

[75] Inventor: Yoichi Saito, Tokyo, Japan

[73] Assignee: Fuji Jukogyo Kabushiki Kaisha, Tokyo, Japan

[21] Appl. No.: 835,247

[22] Filed: Feb. 13, 1992

[30] Foreign Application Priority Data

Feb. 27, 1991 [JP] Japan .................................. 3-53620

[51] Int. Cl.⁵ ............................................ F02M 25/07
[52] U.S. Cl. ...................................... 123/571; 123/1 A
[58] Field of Search ............... 123/1 A, 494, 568, 569, 123/571

[56] References Cited

U.S. PATENT DOCUMENTS

| | | | |
|---|---|---|---|
| 4,388,912 | 6/1983 | Kimura et al. | 123/569 |
| 4,466,416 | 8/1984 | Kawamura | 123/571 |
| 4,723,527 | 2/1988 | Panten et al. | 123/571 |
| 4,848,303 | 7/1989 | Fujimoto et al. | 123/571 |
| 4,971,015 | 11/1990 | Gonze | 123/494 |
| 5,060,619 | 10/1991 | Sakurai et al. | 123/494 |
| 5,090,389 | 2/1992 | Oota | 123/1 A X |
| 5,115,790 | 5/1992 | Kawamura | 123/571 |

FOREIGN PATENT DOCUMENTS 56-162256 12/1981 Japan .

Primary Examiner—Willis R. Wolfe
Attorney, Agent, or Firm—Martin A. Farber

[57] ABSTRACT

An engine for an FFV has an alcohol concentration sensor provided in a fuel system for sensing concentration of alcohol in fuel, and an EGR valve provided between an exhaust port and an intake passage of the engine for controlling an EGR ratio. The EGR ratio is increased with an increase of the alcohol concentration, and increased in an intermediate engine load range other than that of other engine load ranges.

6 Claims, 2 Drawing Sheets

METHOD FOR CONTROLLING AN EXHAUST GAS RECIRCULATION SYSTEM OF A FLEXIBLE FUEL VEHICLE ENGINE

BACKGROUND OF THE INVENTION

The present invention relates to a method for controlling an exhaust gas recirculation (EGR) system of an engine mounted on a flexible fuel vehicle (FFV), and more particularly to a control method for properly reducing the amount of NOx which included in exhaust gases.

Various attempts have been made to provide engine control systems enabling the engine to be operated with alcohol mixed fuel because of energy shortage and improvement of emission control in these days.

The flexible fuel vehicle having such an engine control system can be driven with gasoline only, or mixed fuel of gasoline and alcohol, or alcohol only. Namely, the concentration of the alcohol in the fuel changes between 0% (gasoline only) to 100% (alcohol only) in dependency on situation of a driver of the vehicle.

An alcohol concentration sensor is provided in a fuel system for sensing the concentration of alcohol in the fuel. An alcohol concentration signal is applied to a control unit in which fuel injection quantity, ignition timing, and desired supercharging pressure are properly determined in dependency on the alcohol concentration, thereby properly operating the engine.

Alcohol has a lower combustion temperature than that of gasoline. Therefore, if the alcohol concentration of the fuel is high, the amount of NOx in the exhaust gases is considerably reduced. Since an octane number of the fuel is increased under above described condition, it is possible to set a compression ratio of the engine to a high value for the FFV, thereby improving thermal efficiency. However, if the engine has a high compression ratio, the combustion temperature rises to cause the amount of Nox to increase when fuel having a high gasoline concentration is used. In order to effectively reduce the amount of NOx, it is desirable to use the EGR system in the engine for the FFV.

Japanese Patent Application Laid-open 56-162256 discloses an EGR system of an engine for the FFV. If combustion efficiency decreases in a high alcohol concentration range, the operation of the EGR system is stopped or the amount of recirculating exhaust gas is reduced, thereby improving the engine efficiency.

However, the amount of recirculated gas is only controlled at two values in accordance with the alcohol concentration, so that the EGR system can not be properly controlled under various operating conditions of the engine. It is necessary to finely control the EGR system in consideration of the alcohol concentration, the engine operating conditions, output power of the engine, and fuel consumption.

SUMMARY OF THE INVENTION

An object of the present invention is to provide a controlling method of an EGR system in which exhaust gas is properly recirculated in dependency on alcohol concentration and engine operating conditions, thereby effectively reducing the amount of NOx in exhaust gases and improving output power and fuel consumption of the engine.

According to the present invention, there is provided a method of controlling the EGR system of the engine for an FFV having an alcohol concentration sensor provided in a fuel system for sensing the alcohol concentration in the fuel and for producing an alcohol concentration signal, and an EGR valve provided between an exhaust port and an intake system of the engine, characterized by the steps of setting an EGR ratio to a decreasing function of the alcohol concentration, and increasing the EGR ratio in an intermediate engine load range.

In the present invention, when the alcohol concentration in the fuel is low and hence combustion temperature increases, the EGR ratio is set to a large value. Thus, the amount of the recirculated exhaust gas is increased so that the amount of NOx is effectively reduced. At light and heavy engine loads, the amount of the recirculated exhaust gas is restricted, thereby improving the output power and the fuel consumption of the engine.

The other objects and features of the present invention will become understood from the following description with reference to the accompanying drawings.

DETAILED DESCRIPTION OF THE PREFERRED EMBODIMENT

Figure 1:
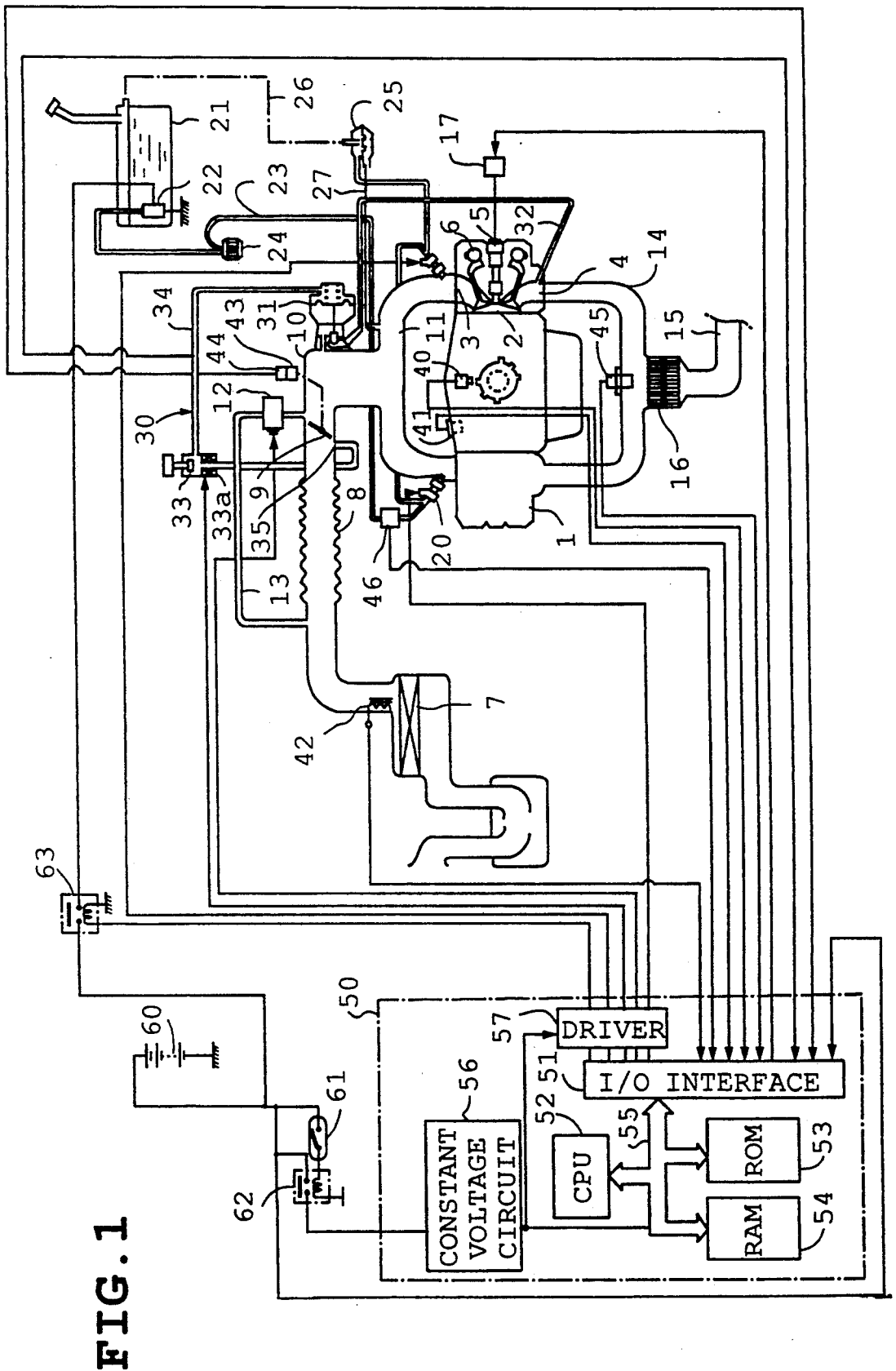
FIG. 1 is a schematic illustration of a system according to the present invention.

Referring to FIG. 1 showing a horizontal opposed type four-cylinder engine 1 of the FFV to which the present invention is applied, a cylinder head 2 of the engine 1 has intake ports 3 and exhaust ports 4 which are communicated with an intake manifold 11 and an exhaust manifold 14, respectively. A spark plug 5 is located at the top of each combustion chamber in the cylinder head 2. Valve mechanisms 6 are provided on the intake and exhaust ports 3 and 4, respectively. A throttle chamber 10 having a throttle valve 9 is communicated with the intake manifold 11. The throttle chamber 10 is communicated with an air cleaner 7 through an intake pipe 8.

A bypass 13 having an idle speed control valve 12 is formed around the throttle valve 9, thereby controlling idling engine speed.

The exhaust manifold 14 is communicated with an exhaust pipe 15 in which a catalytic converter 16 having a three-way catalyst is mounted.

In the fuel system of the engine 1, fuel injectors 20 are provided in the intake manifold 11 adjacent every intake port 3. Fuel in a fuel tank 21 is supplied to an injector 20 through a fuel passage 23. In the tank 21, mixed fuel of gasoline and alcohol at an alcohol concentration between 0% to 100% is stored.

A fuel pump 22 is provided in the tank 21. The fuel in the tank 21 is supplied to the injectors 20 by the pump 22 through the passage 23 having a filter 24, and returned to the tank 21 through a pressure regulator 25 and a return passage 26. A pressure regulating chamber defined by a diaphragm in the pressure regulator 25 is communicated with the intake manifold 11 through a passage 27. The amount of the fuel returned to the tank is regulated by a negative intake pressure in the intake manifold 11 to provide a high fuel pressure.

An EGR system 30 is provided for reducing the amount of NOx. An EGR pipe 32 having an EGR valve 31 is provided between the exhaust port 4 and the intake manifold 11 downstream of the throttle chamber 10. A control chamber of the EGR valve 31 is communicated with a duty solenoid operated valve 33 through a vacuum line 34. The valve 33 is communicated with a negative pressure port 35 formed in the intake pipe 8 upstream of the throttle valve 9. A solenoid 33a is energized by a duty signal D applied from an electronic control unit to control the negative pressure supplied to the control chamber of the EGR valve 31.

In an electronic control system, a crank angle sensor 40 and a coolant temperature sensor 41 are provided on the engine 1. An air-flow meter 42 is provided in the intake pipe 8 downstream of the air cleaner 7. A throttle position sensor 43 is provided for detecting an opening degree of the throttle valve 9. An idle switch 44 is provided adjacent the throttle position sensor 43 for detecting the throttle valve 9 at an idling position. An $O_2$-sensor 45 is provided in the exhaust pipe 15 for detecting oxygen concentration of the exhaust gas, an alcohol concentration sensor 46 is provided on the fuel passage 23 for sensing concentration of alcohol in the fuel.

An electronic control unit 50 having a microcomputer comprises a CPU (central processing unit) 52, a ROM 53, a RAM 54 and an input/output interface 51, which are connected to each other through a bus line 55. A constant voltage circuit 56 is connected to each element of the control unit 50 for supplying a predetermined constant voltage. Power is applied from a battery 60 to the constant voltage circuit 62 through a contact 30 of a relay 62. The battery 60 is connected to a coil of the relay 62 through an ignition switch 61, and to the fuel pump 22 through a contact of a relay 63.

Output signals of the sensors 40-43, 45, 46 and the switch 44 are applied to an input port of the input/output interface 51. An output port of the I/0 interface 51 is connected to the spark plug 5 of the corresponding cylinder through an ignitor 17 and a driver 57. The driver 57 is connected to the idle speed control valve 12, the duty solenoid valve 33, the injectors 20, and the coil of the relay.

Control programs and fixed data are stored in the ROM 53. Output signals of the sensors and the switch are stored in the RAM 54. The RAM 54 stores output signals of the sensors and the switch after processing data in the CPU 52.

The CPU 52 calculates a fuel injection pulse width, an ignition timing and the duty ratio D of the control signal for controlling the duty solenoid operated valve 33 in accordance with the control programs in the ROM 53 and based on various data in the RAM 54. The corresponding signals are fed to the injector 20, the ignitors 17 and the duty solenoid valve 33 for controlling the air-fuel ratio, the ignition timing, and the amount of the recirculated exhaust gas by the EGR valve 31, respectively.

During the operation of the engine 1, the alcohol concentration sensor 46 detects the alcohol concentration M of the fuel which is supplied to the control unit 50. An engine speed N, a coolant temperature Tw, a throttle opening degree $\alpha$, and an intake air quantity Q are detected by the crank angle sensor 40, the coolant temperature sensor 41, the throttle position sensor 44, and the air flow meter 42, respectively, and supplied to the control unit 50. The control unit 50 determines a proper fuel injection quantity Ti and an ignition timing $\Theta IG$ in accordance with engine operating conditions and the alcohol concentration M. A fuel injection quantity signal and an ignition the timing signal dependent on the quantity Ti and timing $\Theta IG$ are supplied to the fuel injectors 20 and the ignitors 17, respectively. The mixed fuel of the gasoline and the alcohol in the tank 21 is injected from the fuel injector 20 into the combustion chamber. The mixed fuel is mixed with air in the chamber and ignited by the spark plug 5 at a proper ignition timing. Thus, the engine is operated with mixed fuel.

Figure 2:
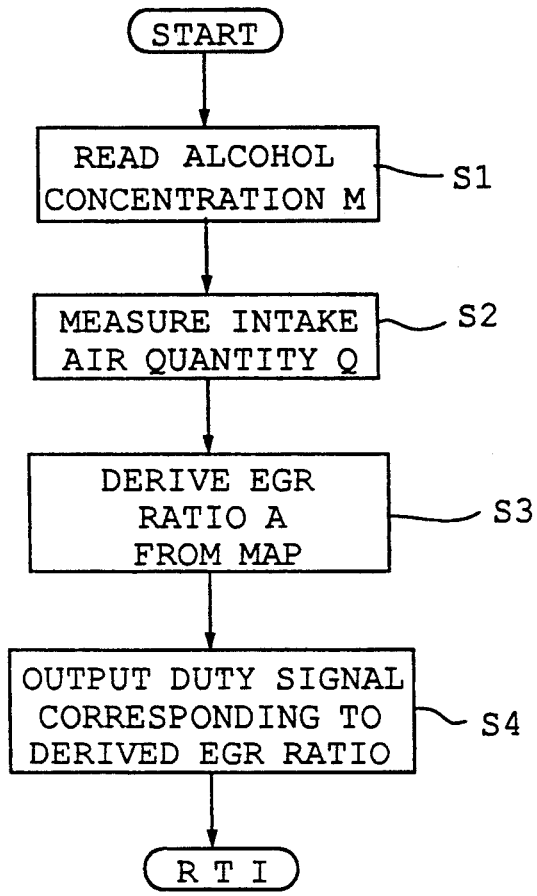
FIG. 2 is a flowchart showing an operation for controlling an EGR system.

During the operation of the engine 1 except for the engine idling, it is possible to control the EGR system. The operation of the EGR system will be described hereinafter with reference to the flowchart of FIG. 2. When the control unit 50 is energized, the interruption is executed at predetermined time intervals.

At a step S1, the alcohol concentration M is read, and the intake air quantity Q is measured at a step S2. At a step S3, the EGR ratio A is derived from a map in accordance with the alcohol concentration M and the intake air quantity Q as parameters.

Figure 3:
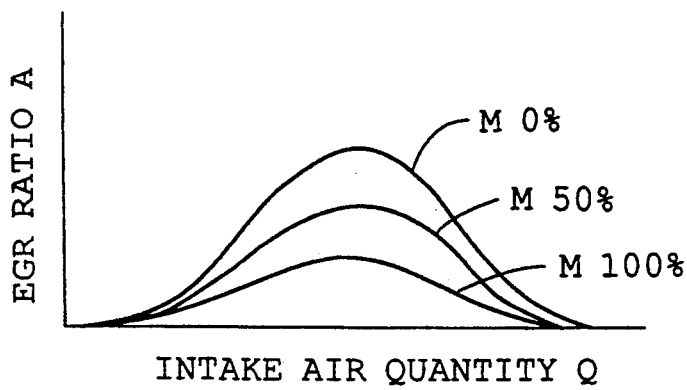
FIG. 3 is an EGR ratio map.

FIG. 3 shows a map of the EGR ratio A in a two-dimensional map in accordance with the alcohol concentration M and the intake air quantity Q. The EGR ratio A is determined as a decreasing function of the alcohol concentration M and to be increased with the intake air quantity Q in an intermediate load range of the engine 1.

At a step S4, the EGR signal of the duty ratio D corresponding to the EGR ratio A is produced for operating the duty solenoid operated valve 33.

If the alcohol concentration M is high, the combustion temperature becomes low, so that the amount of NOx is small. Therefore, in such a state, the EGR ratio A is determined to a small value. Consequently, the duty solenoid valve 33 is slightly opened, so that the negative pressure supplied to the control chamber of the EGR valve 31 becomes low. Thus, the EGR valve 33 is slightly opened to restrict the amount of recirculated exhaust gas.

If the alcohol concentration M is reduced and the combustion temperature is raised, the EGR ratio becomes large to increase opening degree of the solenoid operated valve 33. As a result, the negative pressure supplied to the control chamber of the EGR valve 31 is increased to largely open the valve 31, so that the large amount of the exhaust gas is recirculated. The exhaust gas lowers the combustion temperature, thereby reducing the amount of NOx.

In a light engine load range, the opening degree of the EGR valve 31 is reduced to restrict the recirculated exhaust gas. Thus, a stable combustion is properly ensured, thereby improving fuel consumption. At a heavy load, since the recirculated exhaust gas is also restricted, the power of the engine 1 is increased. In an intermediate engine load range, the opening degree of the EGR valve 31 is increased to increase the amount of the recirculated exhaust gas. Thus, the amount of NOx is effectively reduced.

The EGR ratio map can be composed of other parameters than the alcohol concentration M and the intake air quantity Q such as the engine speed and the coolant temperature, which may improve control accuracy of the system.

In accordance with the present invention, the EGR ratio is finely determined in accordance with the alcohol concentration as the decreasing function. The EGR system is variably controlled corresponding to the alcohol concentration in accordance with the EGR ratio so that the amount of NOx is reduced in a whole load range of the engine.

The EGR ratio is reduced at high alcohol concentration so as to maintain a good combustion state. It is possible to set compression ratio of the engine for the FFV to a high value due to an optimum control of EGR, thereby improving the thermal efficiency. Since the EGR ratio is determined to be small at the light and heavy engine loads, the fuel consumption and the power of the engine can be improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling an EGR system of an FFV engine having, an alcohol concentration sensor provided in a fuel system for sensing concentration of alcohol in fuel and for producing an operating condition signal, an EGR valve provided in an EGR pipe connected between an exhaust port and an intake passage of the engine for recirculating exhaust gases to said intake passage, and electronic control means for controlling exhaust gas recirculation ratio, the improvement of the system which comprises:

storing means for storing a plurality of EGR ratios,

EGR ratio setting means for determining a decreasing function of alcohol concentration and an increasing function of said alcohol concentration in an intermediate engine load range so as to provide a larger amount of said exhaust gas recirculation than that of other load ranges;

setting means responsive to the alcohol concentration signal and to the operating condition signal for deriving a corresponding exhaust gas recirculation ratio from the storing means and for producing an exhaust gas recirculation ratio signal; and control means responsive to said exhaust gas recirculation ratio signal for opening the EGR valve so as to attain an optimum control of said engine.

2. The system according to claim 1, further comprising:

detecting means for detecting an intake air quantity.

3. A method for controlling an EGR system of an FFV engine having an alcohol concentration sensor provided in a fuel system for sensing concentration of alcohol in fuel, detecting means for detecting engine operating conditions, an EGR valve provided in an EGR pipe connected between an exhaust port and an intake passage of the engine, and electronic control means for controlling an exhaust gas recirculation ratio, comprising the steps of:

setting the exhaust gas recirculation ratio to a decreasing function of alcohol concentration, and opening the EGR valve in an intermediate engine load range so as to provide a larger exhaust gas recirculation ratio than that of other load ranges.

4. The method according to claim 3, wherein the detecting means detects an intake air quantity.

5. The method according to claim 3, wherein the detecting means detects an engine speed.

6. The method according to claim 3, further comprising the steps of:

detecting an engine speed; and sensing a coolant temperature.

* * * * *